United States Patent [19]

Iwashita et al.

[11] Patent Number: 4,859,037
[45] Date of Patent: Aug. 22, 1989

[54] LIQUID CRYSTAL ELECTRICALLY-CONTROLLED BIREFRINGENCE DISPLAY DEVICES WITH IMPROVED CONTRAST

[75] Inventors: Yukihiro Iwashita; Masashi Mochizuki, both of Suwa, Japan

[73] Assignee: Seiko Epson Corporation, Tokyo, Japan

[21] Appl. No.: 116,945

[22] Filed: Nov. 5, 1987

[30] Foreign Application Priority Data

Feb. 18, 1986 [JP] Japan .................................. 61-33577
Feb. 18, 1986 [JP] Japan .................................. 61-33576
Feb. 18, 1987 [WO] PCT Int'l Appl. ... PCT/JP87/00104

[51] Int. Cl.$^4$ ................................................ G02F 1/13
[52] U.S. Cl. ................................ 350/339 F; 350/337; 350/347 E
[58] Field of Search ................ 350/337, 339 F, 347 E

[56] References Cited

U.S. PATENT DOCUMENTS 3,785,721 1/1974 Harsch ............................ 350/347 E
4,652,087 3/1987 Bos et al. ........................ 350/347 E
4,674,841 6/1987 Buzak .............................. 350/347 E

FOREIGN PATENT DOCUMENTS 55-60920 5/1980 Japan .
55-60921 5/1980 Japan .
56-47011 4/1981 Japan .
5590618 6/1982 Japan .
60-162225 8/1985 Japan .
60-162226 8/1985 Japan .

Primary Examiner—Stanley D. Miller
Assistant Examiner—Richard F. Gallivan
Attorney, Agent, or Firm—Blum Kaplan

[57] ABSTRACT

The present invention provides an improved positive type liquid crystal display device in the birefringence mode, wherein at least one of the polarizers is a colored polarizer including the character of making the background color of the display approximately white, thereby improving the contrast ratio extremely. Further, in the negative type liquid crystal display device, a color filter for absorbing the light of the wavelength area which transmits at the time of an off state and non-selecting, is provided in series with respect to a light source and the liquid crystal display portion, thereby preventing the color shading of the background color.

11 Claims, 4 Drawing Sheets

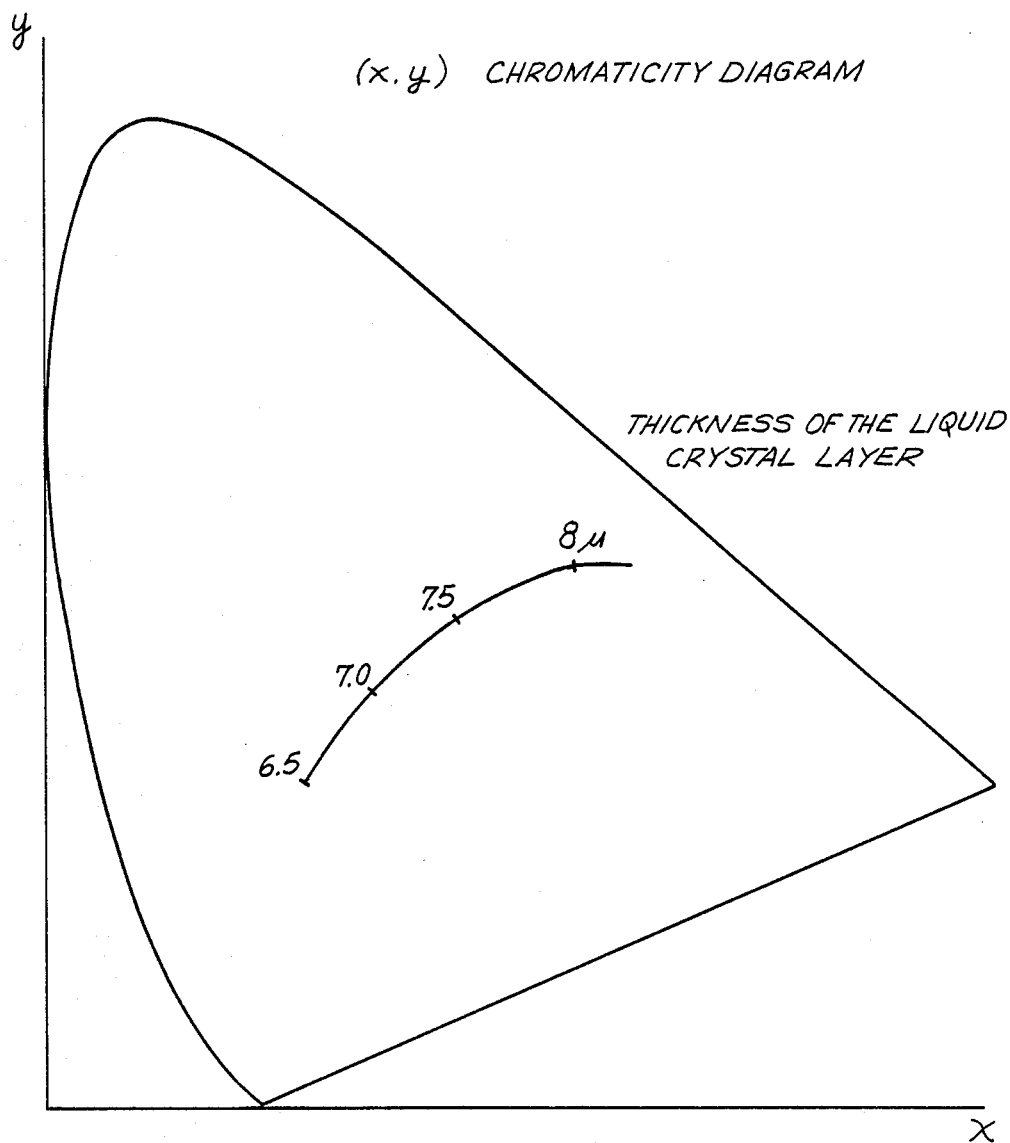

LIQUID CRYSTAL ELECTRICALLY-CONTROLLED BIREFRINGENCE DISPLAY DEVICES WITH IMPROVED CONTRAST

TECHNICAL FIELD

The present invention relates to a liquid crystal display device, particular to a liquid crystal display device and in employing the birefringence mode.

BACKGROUND ART

There are several modes proposed as the display mode for a liquid crystal display device. As one of the most general mode, is a twisted nematic mode (hereinafter referred to as TNM). This TNM is available for use in a calculator, watch, large-sized display and so on. However, recently there are increasing demands being made of the display device which needs high duty driving. This is the reason that there is the limit of the high duty driving in the above TNM, thereby not obtaining the sufficient contrast ratio. Accordingly, attention is being given to the method of using the birefringence mode again as shown in Japan-Laid Open No. 60-50511 and the others.

In the Japan-Laid Open No. 60-50511, the liquid crystal display device is disclosed, wherein the twisted angle of the liquid crystal molecule is large, between 160° and 200°, a pair of polarizers are provided on the upper and lower liquid crystal cells, and the angle between the above polarizing axis (absorption axis) and the molecular axis direction of the liquid crsytal molecule adjacent to the electrode substrate falls within the range from 30° to 60°. In case of the liquid crystal display device using the above birefringence mode, it results in the background and the display portion of the display screen being colored by the dispersal due to the wavelength of the light. For example, in case of the positive display, the background is displayed as a green to reddish yellow color and the display portion is displayed as a blue. On the other hand, in case of the negative display, the background is displayed as a dark blue and the display portion is displayed as a light yellow color. As the display device, the color shade of green to reddish yellow is not desirable because it is difficult for men to accept mentally.

With respect to the above display, some experiments have been conducted on the background color as reported in "Investigation Report for VDT Guide Line", Japan Electronic Industry Development Association, March of 1985. From this article, it has been considered that the light color is desiable for the background color in case of the positive display device.

However, as mentioned above, the background color is never displayed as a light color in case of where the birefringence mode is employed. FIG. 3 shows the background color on the xy chromaticity diagram, wherein the optical anisotropy of the liquid crystal is $n=0.12$, the thickness of the liquid crystal layer is $8\mu$, the twist angle of the liquid crsytal molecle is 180°, and the angle between the nearest optical axis of the liquid crystal molecule and the polarizing axis of the polarizer is 45°. In particular, the background color inpropotion to the thickness of the liquid crystal layer from $6.5\mu$ to $8\mu$. According to FIG. 3, it is clear that the background color is not a pale color even though the thickness of the liquid crystal layer is varied.

Next, in case of the negative display device, the light source is provided at the back side of the liquid crystal display portion in the liquid crystal display device employing the above birefringence mode, then viewer observes the liquid crystal display portion. So, the background color of the liquid crystal display portion becomes blue. Background color varies and is sensitive depending on the thickness of the liquid crystal layer. Especially, since the blue color is the area where it is sensed that the color difference is largest, it tends to occur the color shading in the background in case of using the bright light source. Therefore, it is very difficult for us to obtain the uniform display surface of the background color.

The present invention is to solve the above defects of the liquid crystal display device employing the conventional birefringence mode as mentioned above. The object of the present invention is to provide an improved display device in the liquid crystal display device by the birefringence mode, wherein in case of the positive display, the background color is displayed as a pale color, thereby making the display device having the high contrast ratio, on the other hand, in case of the negative display, the background color is without a color shading.

DISCLOSURE OF INVENTION

First, reference is made to the case of the positive display device. When a monochrome polarizer is used in the birefringence mode, the background of the display is colored due to the dispersion by the wavelength of the light. As a result of that, the spectral transmissivty of the colored background is, for example, shown in FIG. 4. The spectral transmissivity in the non-selected portion during the displaying is shown in FIG. 5, and that in the selected portion is shown in FIG. 6. Therefore, the display contrast occures according to the transmittance or absorption of wavelength from 500 nm to 600 nm affecting the background color. In order to prevent color development in the background by providing a color filter on the display surface in series along the line of light, it is required that light in the wavelength range affecting the display contrast is absorbed. However, when light of that wavelength is absorbed by the above method, the display contrast becomes worse. Accordingly, this method is not adequate for preventing color development.

On the other hand, changing the absorption property of at least one or both polarizers, and using a colored polarizer whose color is close to the complementary color of the background color at the time of when the monochrome polarizer is employed improves the results. In this case, the spectral transmissivity of the background color is shown in FIG. 2. Namely, in FIG. 2, more than 20% of the spectral transmissivity is developed over the each wavelength area of 500 nm to 600 nm, 400 nm, 500 nm, and 600 nm to 700 nm affecting on the above background color. Since the light in all wavelength area develops uniformly, the transmitting light is displayed as aproximately white color. From an idealistic viewpoint, the curve showing the transmittance becomes a flat line over the all wavelength area in FIG. 2.

FIG. 9 is an exploded view illustrating assembled positive-type liquid crystal display device assembled in accordance with the invention. The display device includes a liquid crystal display cell 100 including a lower substrate 101 having a liquid crystal orientation direction 102 on its interior surface and an opposed upper liquid crystal substrate 103 with a orientation direction 104. A liquid crystal material is disposed in the space between lower substrate 101 and upper substrate 103. In the positive display device, directions of orientation 102 and 104 are substantially parallel.

A lower polarizer 106 is disposed adjacent to lower substrate 101 and has an axis of polarization 107. An upper polarizer 108 is a colored polarizer and is disposed adjacent to upper substrate 103. Upper polarizer 102 has an axis of polarization 109 disposed substantially orthogonal to axis of polarization 107 of lower polarizer 106.

Second reference is made to the case of the negative display device. The spectral transmissivity of the background of the negative display in case of where a color filter is not provided in the transmissive type liquid crystal display device employing the birefringence mode is shown in FIG. 8. Namely, light of wavelength 500 nm and below and 600 nm or more is transmitted. Therefore, a yellow or green colored filter is provided at any position which is located in series along the line of sight with respect to the light source and liquid crystal display portion, thereby realizing the absorption of the light when the display is off. Specifically, in the off state, or non-selecting, state, this makes the color of background aproximately black. At this time, the display color at the time when the selecting signal is applied, is a green or yellow color. This is the display having good visibility.

A negative type liquid crystal display device is shown in an exploded schematic view. The display includes a liquid crystal display cell 120 including a lower liquid crystal 121 having a liquid crystal orientation direction 122 and a spaced apart upper substrate 123 having a liquid crystal orientation direction 124. A liquid crystal material is disposed in the space between lower substrate 121 and upper substrate 123. A lower polarizer 126 having an axis of polarization 127 is disposed on the outer surface of lower substrate 121. Similarly, an upper polarizer 128 having an axis of polarization 129 is disposed on the outer side of upper substrate 123. In the negative display device, lower polarizing axis 127 is substantially parallel to upper polarizing axis 129.

In this embodiment, a separate color filter 131 is disposed on the outer surface of lower polarizer 126 and a diffusion plate 123 for diffusing light from a light source 136. An illustrative light source 136 includes a diffusion plate 137 for diffusing light from a fluorescent tube 138 with a surrounding reflective plate 139 for directing light to display cell 120.

BRIEF DESCRIPTION OF DRAWINGS

FIG. 3 is an illustration showing the background color of the display in the positive display device employing the conventional birefingence mode.

BEST MODE OF CARRYING OUT THE INVENTION

Embodiment 1

Figure 1:
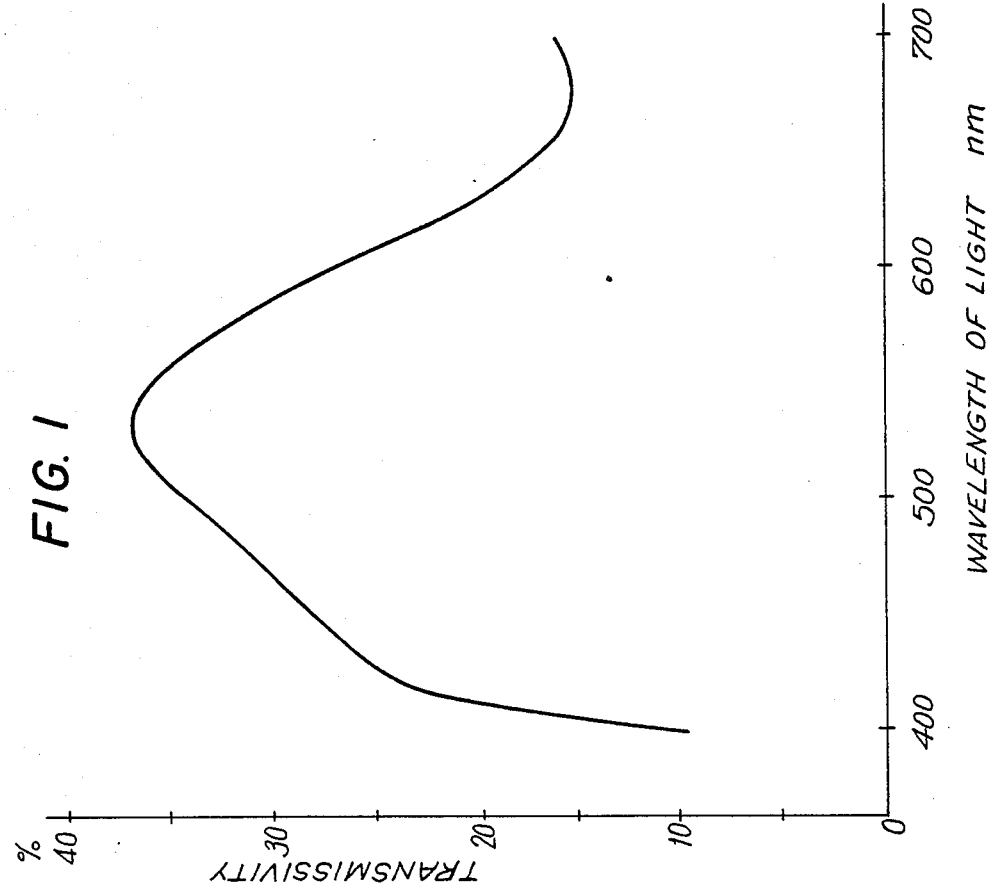
FIG. 1 is an illustration showing the spectral transmissivity of the background color in the positive display device according to Embodiment 1 of the present invention.
Figure 4:
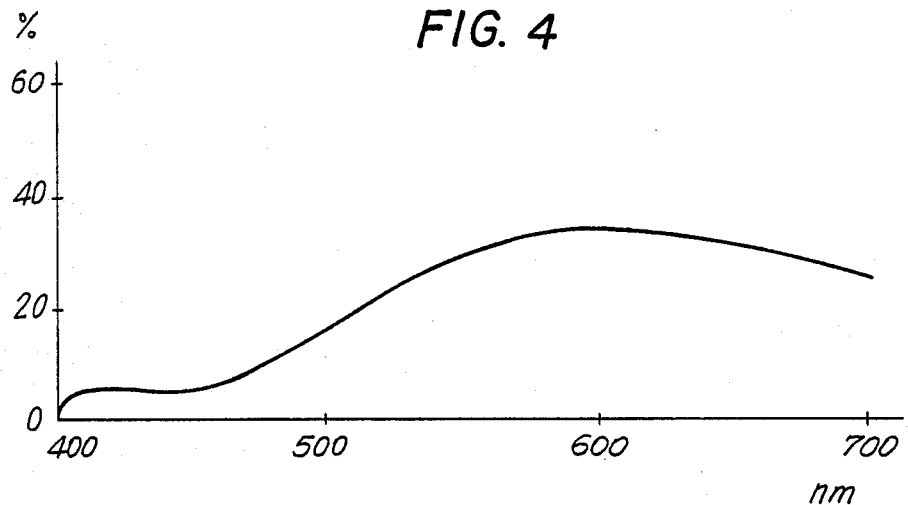
FIG. 4 is an illustration showing the spectral transmissivity at the time of the turn-off in the positive display device employing the conventional birefingence mode
Figure 5:
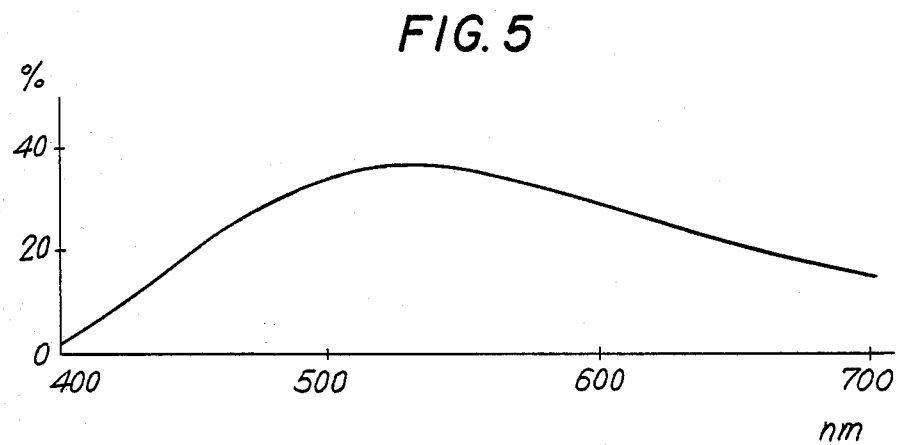
FIG. 5 is an illustration showing the spectral transmissivity at the time of non-selecting time in the positive display device employing the conventional birefingence mode.
Figure 6:
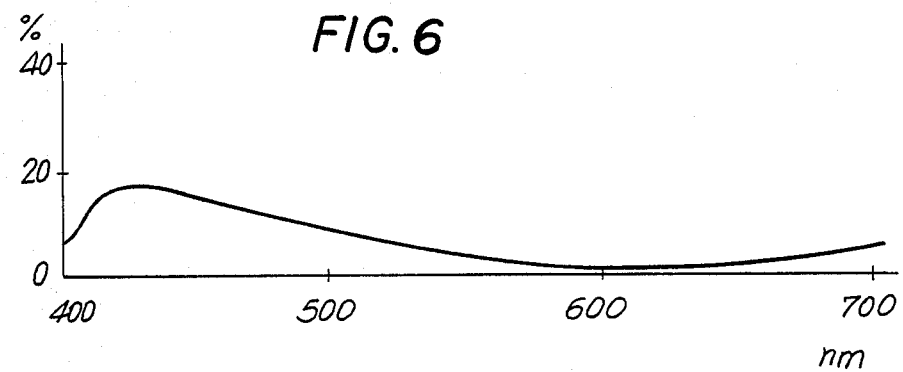
FIG. 6 is an illustration showing the spectral transmissivity at the time of selecting in the positive display device employing the conventional birefringence mode.

In Embodiment 1, the thickness of the liquid crystal layer is $8\mu$, the optical anisotropy of the liquid crystal is 0.12, the twist angle of the director (optical axis) from the upper substrate to lower substrate of the liquid crystal molecule is 180°, the angle between the polarizing axis of the polarizer and the nearest director (optical axis) of the liquid crystal molecule is 45° in a counterclockwise from the side of the liquid crystal molecule, one of two polarizers is monochrome polarizer, and the other is the blue polarizer using dichroic dye. In these circumstances, the spectral property of the background is shown in FIG. 1. From FIG. 1, it is found that the transmissivity in the area of 400 nm to 500 nm is more than 20%. This value is approximately equal to that in the area fo 500 nm to 600 nm. In the area of 600 nm to 700 nm, the transmissivity is shown with the lower property than the other area as mentioned above. Therefore, the background color is displayed as green which is an extremely pale color. Further, the display color is blue in a white ground. Even through the contrast ratio is worse than that in using the monochrome polarizer, it is easy to see and it is difficult to be tired. Not only in the transmissive type, but also when a reflective plate is provided behind the display device, the background color is displayed as a pale green. Further the reflective color of the background at the time when the "C light" is employed, is $x=0.28$, and $y=0.38$.

Embodiment 2

Figure 2:
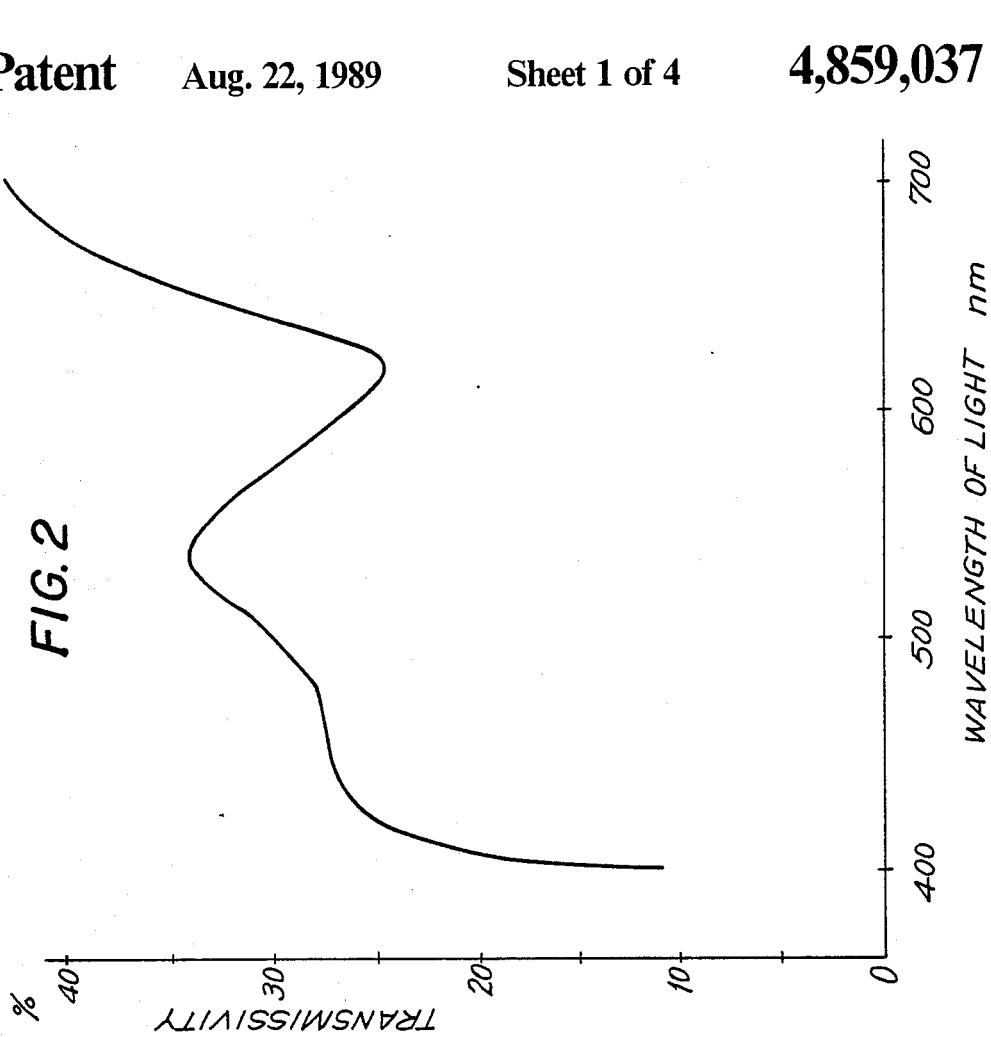
FIG. 2 is an illustration showing the spectral transmissivity of the background color in the positive display device according to Embodiment 2 of the present invention.

In Embodiment 2, a purple polarizer using a dichroic dye in stead of the blue polarizer in Embodiment 1 is employed. The spectral transmissivity of the background is shown in FIG. 2. From FIG. 2, it is found that the transmissivity in both the wavelength area of 400 nm to 500 nm and 600 nm to 700 nm become higher, and it is provided approximately uniform transmissivity including in the 500 nm to 600 nm range. The color of the outside appearance is displayed as approximately white. When the background color is obserbed by the "C light" in the reflective type, it is obtained that $x=0.32$ and $y=0.38$, that is to say the background color is a yellowish white. The display color is dark purple, and the contrast ratio is very large although it is inferior to the time of using the monochrome polarizer.

Embodiment 3

In Embodiment 3, an iodine stained typed Bluish Gray polarizer is used as one of the polarizer instead of the monochrome polarizer in Embodiment 2. The background color comes close to a white color rather than that in Embodiment 2. When making the device a reflective type by providing a reflective plate behind of the display, the background color is close to white. In case of the reflective type, the property in the background color is that x=0.31 and y=0.35 under a "C light". When the polarizer having a lower polarizing degree is used at the side of the plate, the contrast ratio of the display is larger.

Embodiment 4

A homogeneous orienting cell having the properties that the thickness of the liquid crystal layer is 4.5°, the optical anisotropy of the liquid crystal is 0.12, and the twist angle 0°, is sandwiched between polarizers with the angle between the optical axis and the polarizing axis of the liquid crystal being 45°. When a monochrome type polarizer is used for both polarizers, the background color is displayed as yellow. However, when the structure is made to be the same structure of the polarizer as that in Embodiment 3, the background color is displayed as approximately white.

Embodiment 5

Figure 7:
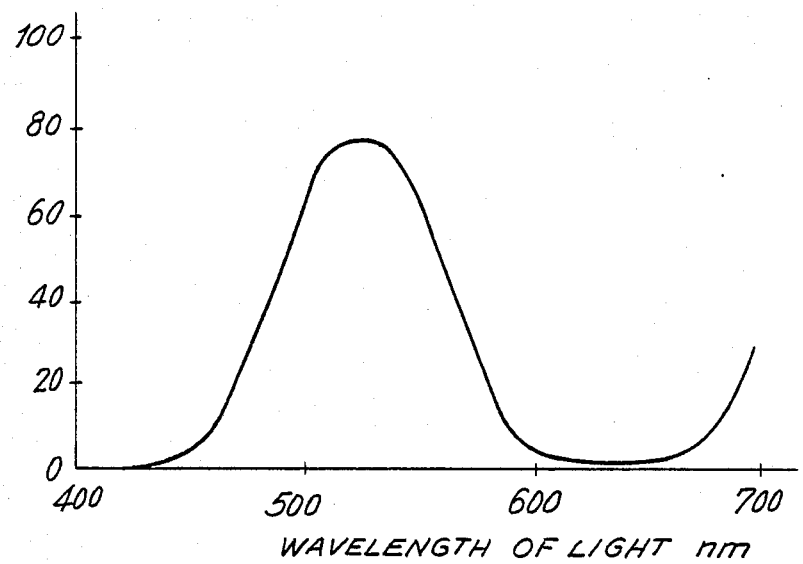
FIG. 7 is an illustration showing the spectral property of the color filter according to Embodiment 5 of the present invention.
Figure 8:
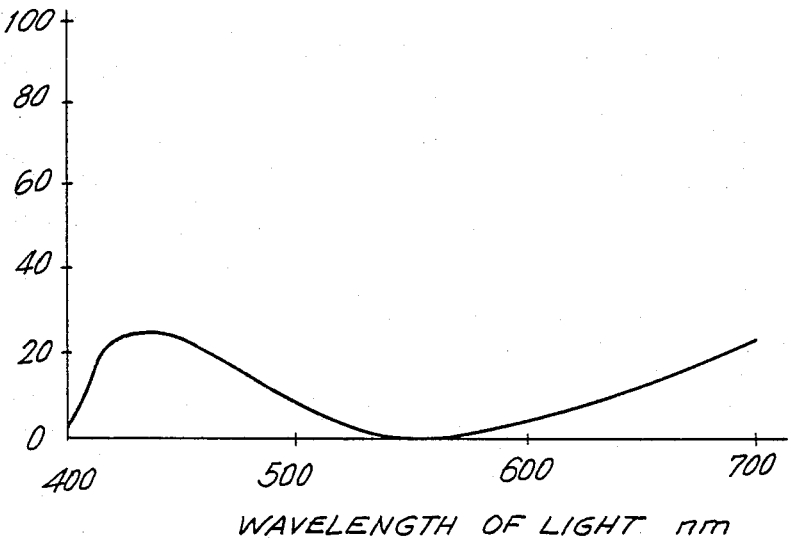
FIG. 8 is an illustration showing the spectral property of the background color of the display in the negative display device employing the conventional birefringence mode.

The liquid crystal display portion is formed by sandwiching the liquid crsytal layer between the upper and lower polarizer, wherein the thickness of the liquid crystal layer is 8μ, the optical anisotropoy of the liquid crystal is 0.12, the twist angle of the director from the upper substrate to lower substrate of the liquid crystal molecule is 180°, and the angle between the polarizing axis of the polarizer and the director (optical axis) of the nearest liquid crystal molecule is 45°. The upper polarizer axis is located in the clockwise, direction on the other hand, the lower polarizer is located in the counterclockwise direction from the the liquid crystal moelcule adjacent the substrate. The iodine-type monochrome polarizer is used as the polarizer. A three colored fluorescent tube is used to the light source, and the light source is combined with a reflective plate and diffusional plate in order to have the approximately uniform luminance across the entire surface of the display. Further, a color filter having the spectral property as shown in FIG. 7 is provided between the light source and the liquid crystal display portion, werein the color filter is formed in the form of film state by mixing the dye into PET (Poly Ethylene Terephthalate). There is almost no light leakage from the turn-off portion and the non-selecting portion, and the color shading of the background color due to the variation of the thickness of the liquid crystal layer is almost not seen. At the time of selecting, the color is displayed as green, thereby obtaining the improved display device having a good visibility.

Embodiment 6

The lower polarizer in Embodiment 5 is set to the angle of 45° in the clockwise direction, thereby forming the liquid crystal display device. The display is made to be the negative type by means of applying the high voltage at the time of non-selecting and, on the other hand, applying the low voltage at the time of selecting. So, the background color at the time of non-selecting is bluish purple color when the color filter is not employed. However, when the color same filter as in Embodiment 5 is placed between the light source and the liquid crystal display portion in series, thereby providing an almost black color. The display color is yellowish green, and the contrast ratio is high, thereby providing a good visiability.

As mentioned above, the present invention provides an improved liquid crystal display device employing the birefringence mode, wherein the background color of the positive display device can be made to be white or approximately white color as in TNM, thereby making the display easy to see, reducing eye fatigue, further thereby eliminating the function of the design flexibility at the time of incorporating the apparatus extremely. Furthermore, it can be realized that the background color of the negative display device is made to be black or approximately black color as in the case of the TNM, and that the improved display having the high contrast ratio can be realized.

Further, in case of where the birefringence mode is used, it is difficult to obtain the uniform background color since the background color of the display is depend on the thickness of the liquid crystal layer. So, the permissible variability of the thickness of the liquid crystal layer should make to be considerable narrow comparing to the TN type. However, according to the present invention, the permissible area is allowed to be one and half time comparing to he case of using the conventional monochrome polarzier, thereby realizing the manufacturing of the liquid crystal display device easily.

As mentioned above, the present invention realizes not only the eliminated function of the liquid crystal display device as the display but also realizes the manufacturing easily. It is readily available for practical use.

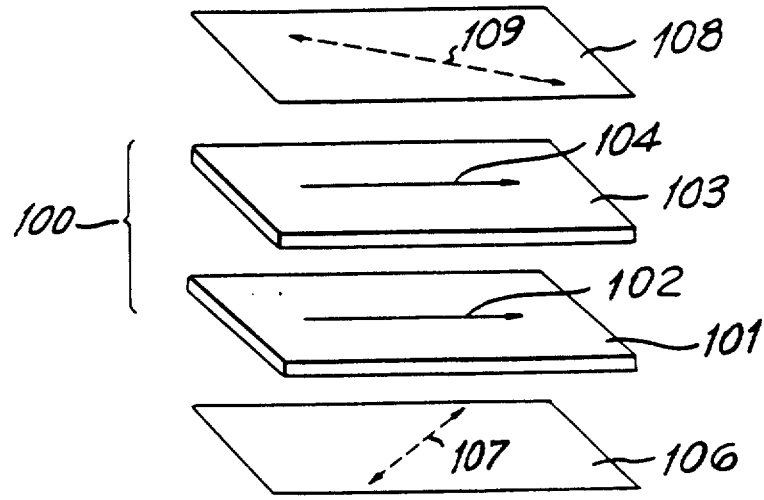

What is claimed is:

1. A liquid crystal display device of the positive display type wherein dark characters are displayed on a light background, comprising:
    a liquid crystal cell including a pair of cooperating spaced apart electrode substrates and a liquid crystal material sandwiched between said two electrode substrates with the liquid crystal material having an orientation direction along the interior surfaces of the electrode substrates;
    a pair of polarizers disposed on both sides of said liquid crystal cell each polarizer having an axis of polarization;
    the angle between the polarizing axis and the molecular direction of orientation of the liquid crystal molecule adjacent to said electrode substrate between 20° to 70°; and
    one of the polarizers being a colored polarizer of a color substantially the same as the complimentary color of the display background observed when monochrome polarizers are used in the display device.

2. The liquid crystal display device of claim 1, wherein the color of said colored polarizer is blue or purple.

3. The liquid crystal display device of claim 1, wherein the liquid crystal material has an angle of twist between the opposed electrode substrates between about 160° and 200°.

4. The liquid crystal display device of claim 1, wherein the angle between the axis of polarization and the orientation direction of the liquid crystal molecules on the surface of the electrode substrate adjacent to the polarizer is between about 30° to 60°.

5. The liquid crystal display device of claim 1, wherein the axes of polarization of the polarizers are substantially orthogonal to each other.

6. The liquid crystal display device of claim 1, further including a reflective plate adjacent to the outer side of one of the polarizers.

7. A liquid crystal display device of the negative display type wherein light characters are displayed on a dark background, comprising:
 a liquid crystal cell including a pair of cooperating spaced apart electrode substrates and a liquid crystal material sandwiched between said two electrode substrates with the liquid crystal material having an orientation direction along the interior surfaces of the electrode substrates;
 a pair of polarizers disposed on both sides of said liquid crystal cell, each polarizer having an axis of polarization;
 the angle between the polarizing axis and the molecular direction of orientation of the liquid crystal molecule adjacent to said electrode substrate is between 20° to 70°;
 a light source disposed adjacent to one polarizer; and
 a color filter for absorbing light of a certain wavelength disposed between the light source and the light crystal display portion.

8. The liquid crystal display device of claim 7, wherein said color filter is in the form of a film formed by mixing a dye into PET (Poly Ethylene Terephthalate).

9. The liquid crystal display device of claim 7, wherein the liquid crystal material has an angle of twist between the opposed electrode substrates between about 160° and 200°.

10. The liquid crystal display device of claim 7, wherein the angle between the axis of polarization and the orientation direction of the liquid crystal molecules on the surface of the electrode substrate adjacent to the polarizer is between about 30° to 60°.

11. The liquid crystal display device of claim 7, wherein the axes of polarization of the polarizers are substantially parallel.

* * * * *

UNITED STATES PATENT AND TRADEMARK OFFICE
CERTIFICATE OF CORRECTION

Page 1 of 3

PATENT NO. : 4,859,037

DATED : August 22, 1989

INVENTOR(S) : Yuk Ihiro Iwashita et al

It is certified that error appears in the above-identified patent and that said Letters Patent is hereby corrected as shown below:

ON THE TITLE PAGE

The title page showing the illustrative figure should be deleted to appear as per the attached title page.

Figure 9:
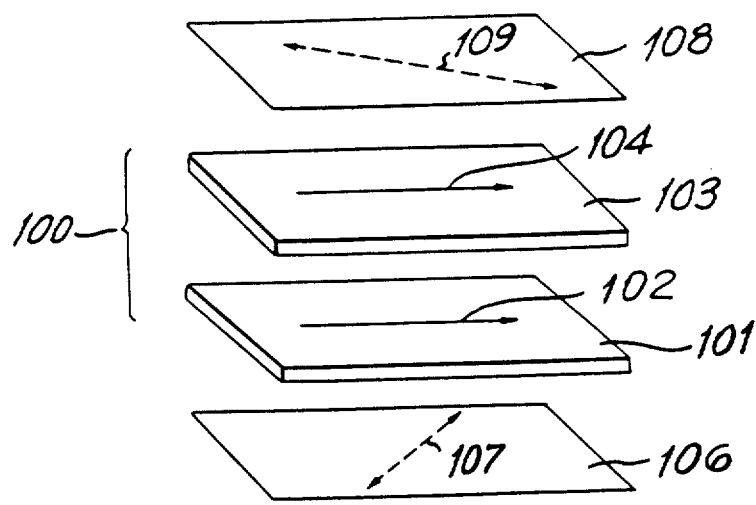
FIG. 9 is a schematic representation of a positive display device prepared in accordance with one embodiment of the invention.
Figure 10:
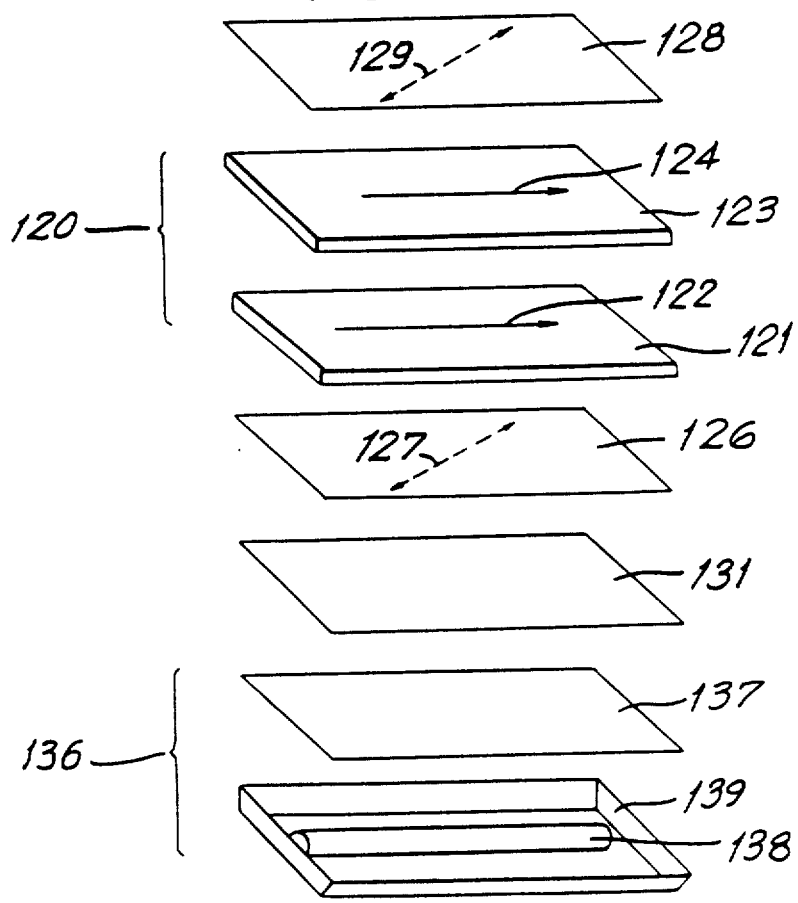
FIG. 10 is a schematic illustration of a negative type display device prepared in accordance with another embodiment of the invention.

One sheet of drawings consisting of Figs. 9 and 10, should be added as shown on the attached page.

Signed and Sealed this

Twenty-fifth Day of February, 1992

Attest:

HARRY F. MANBECK, JR.

*Attesting Officer*  *Commissioner of Patents and Trademarks*

United States Patent [19]

Iwashita et al.

[11] Patent Number: 4,859,037
[45] Date of Patent: Aug. 22, 1989

[54] LIQUID CRYSTAL ELECTRICALLY-CONTROLLED BIREFRINGENCE DISPLAY DEVICES WITH IMPROVED CONTRAST

[75] Inventors: Yukihiro Iwashita; Masashi Mochizuki, both of Suwa, Japan

[73] Assignee: Seiko Epson Corporation, Tokyo, Japan

[21] Appl. No.: 116,945

[22] Filed: Nov. 5, 1987

[30] Foreign Application Priority Data

Feb. 18, 1986 [JP] Japan .................. 61-33577
Feb. 18, 1986 [JP] Japan .................. 61-33576
Feb. 18, 1987 [WO] PCT Int'l Appl. ... PCT/JP87/00104

[51] Int. Cl.⁴ .................................... G02F 1/13
[52] U.S. Cl. ..................... 350/339 F; 350/337; 350/347 E
[58] Field of Search ............ 350/337, 339 F, 347 E

[56] References Cited

U.S. PATENT DOCUMENTS 3,785,721 1/1974 Harsch ................ 350/347 E
4,652,087 3/1987 Bos et al. ............ 350/347 E
4,674,841 6/1987 Buzak ................. 350/347 E

FOREIGN PATENT DOCUMENTS 55-60920 5/1980 Japan .
55-60921 5/1980 Japan .
56-47011 4/1981 Japan .
5590618 6/1982 Japan .
60-162225 8/1985 Japan .
60-162226 8/1985 Japan .

Primary Examiner—Stanley D. Miller
Assistant Examiner—Richard F. Gallivan
Attorney, Agent, or Firm—Blum Kaplan

[57] ABSTRACT

The present invention provides an improved positive type liquid crystal display device in the birefringence mode, wherein at least one of the polarizers is a colored polarizer including the character of making the background color of the display approximately white, thereby improving the contrast ratio extremely. Further, in the negative type liquid crystal display device, a color filter for absorbing the light of the wavelength area which transmits at the time of an off state and non-selecting, is provided in series with respect to a light source and the liquid crystal display portion, thereby preventing the color shading of the background color.

11 Claims, 4 Drawing Sheets